May 2, 1944.  H. V. JAMES  2,347,952
TIRE VULCANIZER
Filed May 30, 1942  2 Sheets-Sheet 1
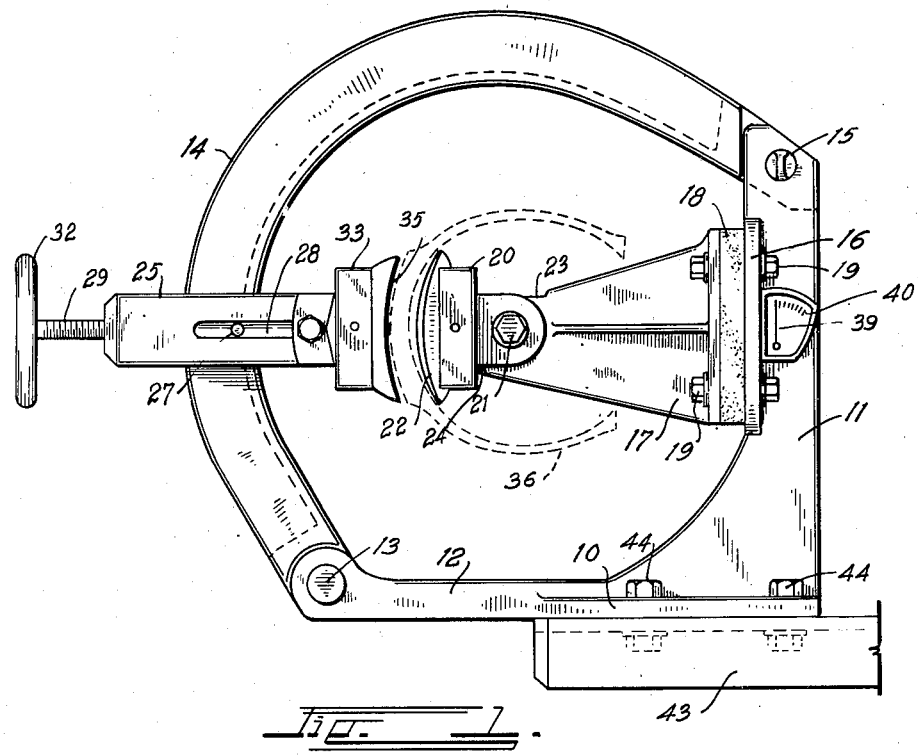
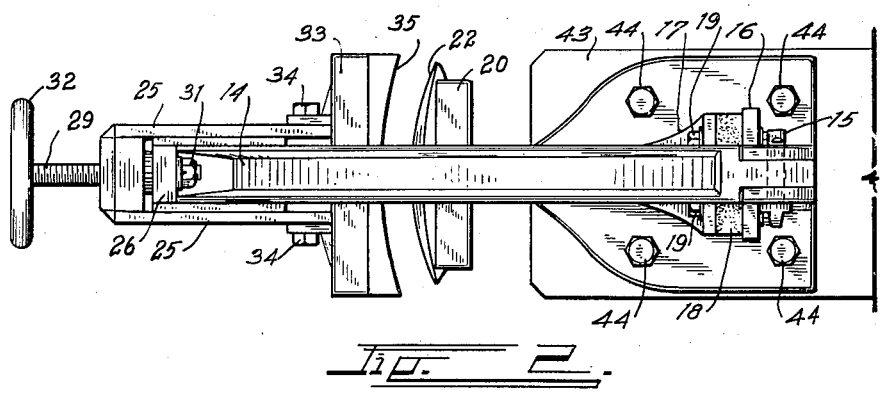
INVENTOR.
HAROLD V. JAMES.
BY
ATTORNEY.

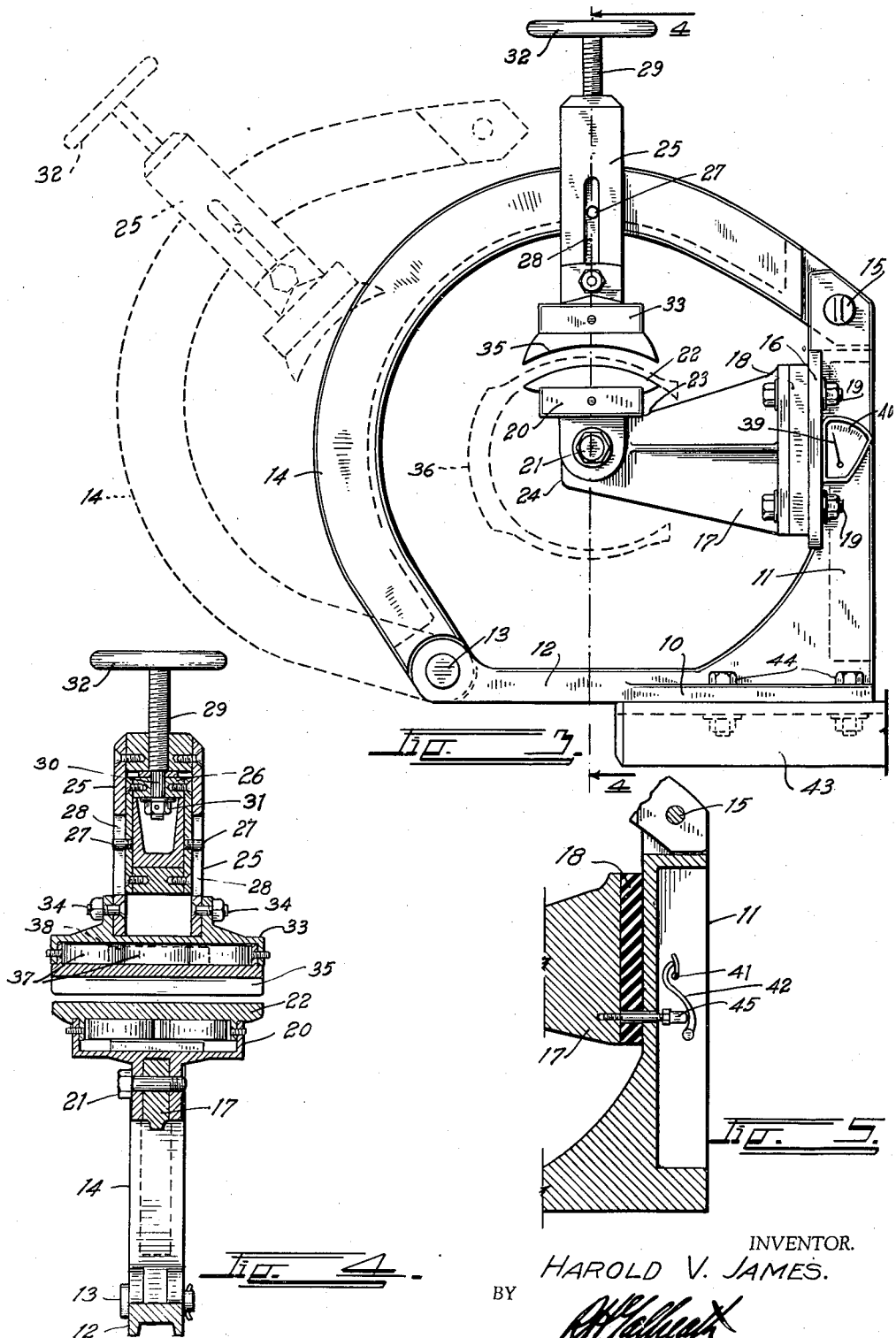

Patented May 2, 1944

2,347,952

UNITED STATES PATENT OFFICE 2,347,952

TIRE VULCANIZER

Harold V. James, Denver, Colo.

Application May 30, 1942, Serial No. 445,407

4 Claims. (Cl. 18—18)

This invention relates to a vulcanizing device for the casings of pneumatic tires and has for its principal object the provision of a simple, easily operated, vulcanizing device which will be more particularly adaptable to the large diameter tires such as used on aircraft.

Other objects of the invention are to provide a device of this type which can be used for repairs on any portions of the side wall or tread of an aircraft tire; to provide means for cushioning and uniformly distributing the pressure on the repair; and to provide means for indicating the amount of pressure which is being applied to the repair so that all repairs may be uniformly compressed.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all veiws of the drawings and throughout the description.

In the drawings:

Fig. 1 is a side view of the improved vulcanizer arranged for a tread repair;

Fig. 2 is a plan view thereof;

Fig. 3 is a side view illustrating the device arranged for a side wall repair;

Fig. 4 is a vertical section, taken on the line 4—4, Fig. 3; and

Fig. 5 is a fragmentary vertical section along the supporting standard.

The invention comprises a base flange 10 from which a vertical standard 11 projects at right angles. An arm 12 projects forwardly from the base flange 10, substantially parallel thereto, terminating in a hinge pin 13. An arcuate clamp arm 14 is pivoted at one of its extremities on the hinge pin 13 and, at its other extremity, engages in a bifurcation in the upper extremity of the standard 11. The latter extremity may be secured in the bifurcation by means of a retaining pin 15. The clamp arm 14 is channel-shaped in cross section and its contour outlines substantially a semicircle.

A bracket plate 16 is formed on the inner face of the standard 11 for supporting a bracket member 17. The bracket member is clamped against a resilient cushion pad 18 of rubber or similar compressible material by means of suitable clamp bolts 19. Four of the bolts 19 are preferably used, there being two bolts arranged adjacent the upper portion of the bracket member 17 and two adjacent the lower portion thereof as illustrated.

A mold support 20 is pivotally mounted on a hinge pin 21 on the extremity of the bracket member 17. The hinge pin is positioned at the center of the arc of the clamp arm 14. The mold support 20 carries a convex, metallic, heated mold plate 22. The support 20 can be rotated to one side to a horizontal position at right angles to the axis of the bracket where it will rest against a stop rest 23 or to a vertical position in alignment with the bracket member 17 against a similar rest 24.

A slidable box 26 surrounds the clamp arm 14 and is movable therealong. A U-shaped, yoke member 25 is fitted over the box 25 and is held in place thereon by means of fixed guide pins 27 which ride in elongated slots 28 in the yoke member. A jack screw 29 is threaded through the head of the yoke member 26 and terminates in a bearing stem 30 in the box 25. The jack screw is prevented from withdrawing from the box by means of suitable lock nuts 31. The outer extremity of the jack screw terminates in a suitable hand wheel 32. Rotation of the hand wheel will force the yoke member toward or away from the sliding box 25 with the slots 28 riding over the guide pins 27.

The box 25 may be formed from a single piece of metal, as a complete unit, or may be formed from inner and outer members connected by means of side plates, as illustrated in Fig. 4.

A second mold support 33 is secured on the inner extremity of the yoke member 26 by means of suitable attachment bolts 34. The mold support 33 carries a concave, metallic, heated mold plate 35 which cooperates with the convex plate 22 to compress a tire casing, such as indicated in broken line at 36, therebetween.

It will be noted that the yoke member can be slid along the clamp arm through an angle of substantially 90° and that at all positions the axis of the jack screw and its related clamp structure will be directed radially inward toward the axis of the hinge pin 21. The inner mold support 20 can also be rotated through a similar arc of substantially 90° with its axis also being directed radially inward toward the axis of the hinge pin 21. Thus, pressure may be applied by the jack screw at any angle within the said 90° without there being any tendency for the inner mold support to turn about its axis.

Each mold plate is provided with suitable electrical heating elements 37 and with any suitable thermostatic switch 38 as is usual in the vulcanizing art.

It can be seen that pressure, either on the head of the bracket or on the side thereof will cause the rubber pad 18 to be compressed either in its entirety, if the pressure is directly on the bracket, or on the side opposite to any side pressure thereon. This compression serves a double purpose: first, it acts as a cushion to accommodate any misalignment so as to prevent damage to the casing and the repair by excessive or uneven pressure; second, it enables a pressure gauge to be operated from the compressive movement of the bracket.

The above is accomplished by extending a push rod 45 from the bracket member 17 through the pad into the hollow interior of the standard 11. The push rod 45 contacts a gauge lever 42 mounted on a gauge shaft 41. The gauge shaft carries an indicating hand 39 positioned to indicate the amount of pressure on an index dial 40. The dial is placed on the outside of the standard within convenient view of the operator, thus, giving the latter an indication at all times of the amount of pressure which is being placed on the casing by the jack screw.

The use and operation of the device is believed to be apparent from the above description. The base flange is bolted to any suitable supporting member, such as illustrated at 43, by means of suitable mounting bolts 44. It may be bolted to a work bench in the position illustrated, or to a vertical post or wall as desired. If bolted to a bench, the casing to be repaired is supported on the bench. If bolted to a vertical member, the casing is simply suspended over the heating plate 22.

To place the casing in the device the retaining pin 15 is withdrawn and the clamp arm is swung open. The repaired section is placed over the plate 22, the latter being turned to the proper angle to engage the repair section on the inside of the casing. The clamp arm is then closed and locked and the box 25 is slid therealong to position the outer plate 35 over the outside of the repair. The hand wheel is then rotated to compress the repair between the two plates and the heating current is applied.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A tire vulcanizer comprising: a V-shaped, rigid member; a U-shaped hinged member; a pivot pin joining one extremity of said hinged member to one extremity of said rigid member; detachable means for securing the other extremities of both members together; a bracket extending inwardly from one side of said rigid member toward the center of curvature of said hinged member; an inside heating plate rotatably mounted on the extremity of said bracket; a box-like sliding member movable along the hinged member; a U-shaped yoke fitted over the box member and shiftable thereon transversely of the hinged member towards and away from the center of curvature of the hinged member; guide members extending from the box-like member to guide the movements of the yoke across the said hinged member; an outside heating plate carried by the inner extremity of said yoke; and a jack screw carried by said box-like member and threaded through the outer end of the yoke for moving said yoke inwardly and outwardly on said sliding member.

2. A tire vulcanizer comprising: a V-shaped, rigid member; a U-shaped hinged member; a pivot pin joining one extremity of said hinged member to one extremity of said rigid member; detachable means for securing the other extremities of both members together; a bracket extending inwardly from one side of said rigid member toward the center of curvature of said hinged member; an inside heating plate rotatably mounted on the extremity of said bracket; an outside heating plate movable along said hinged member; means for urging said outside plate toward said inside plate; an elastic pad between said bracket member and said rigid member; a pin carried by said bracket and passing through said pad, and a gauge actuated by movement of said pin for translating movements of said bracket member into terms of pressure.

3. A tire vulcanizer comprising: a base member; an arm member projecting horizontally forward from said base member; a standard projecting vertically from said base member; an arcuately curved clamp arm pivoted on the forward extremity of the horizontal arm and extending upwardly and rearwardly therefrom and detachably connected with the upper extremity of said standard; a bracket member mounted on the forward face of said standard and extending forwardly within the arc of said clamp arm; a mold support pivoted on the forward extremity of said bracket member at the center of curvature of the clamp arm; a box surrounding said clamp arm and slidable therealong; a yoke about said box slidable along the same transversely of the clamp arm towards and away from the center of curvature of the clamp arm; an outer mold plate carried on the inner extremity of said yoke; and means carried by said box and engaging said yoke for forcing said yoke toward the pivot point of said mold support.

4. A tire vulcanizer comprising: a base member; an arm member projecting horizontally forward from said base member; a standard projecting vertically from said base member; an arcuately curved clamp arm pivoted on the forward extremity of the horizontal arm and extending upwardly and rearwardly therefrom and detachably connected with the upper extremity of said standard; a bracket member mounted on the forward face of said standard and extending forwardly within the arc of said clamp arm; a mold support pivoted on the forward extremity of said bracket member at the center of curvature of the clamp arm; a box surrounding said clamp arm and slidable therealong; a yoke about said box slidable thereon transversely of the clamp arm towards and away from the center of curvature of the clamp arm; an outer mold plate carried on the inner extremity of said yoke, said yoke member being formed with longitudinally extending slots; pins carried by said box and engaged in the slots to guide and limit sliding of the yoke relative to the box; and a screw rotatably carried by the outer extremity of said box and threaded through said yoke for moving said yoke member transversely of the arm towards and away from the center of curvature of said arm.

HAROLD V. JAMES.